US012689505B2

(12) United States Patent   (10) Patent No.: US 12,689,505 B2
Yamanaka et al.                    (45) Date of Patent:      Jul. 21, 2026

(54) DETECTION SYSTEM, DETECTION METHOD, AND DETECTION PROGRAM

(71) Applicant: NTT, Inc., Tokyo (JP)

(72) Inventors: Yuki Yamanaka, Musashino (JP);
Hiroyoshi Takiguchi, Musashino (JP);
Masanori Shinohara, Musashino (JP);
Tomohiro Nagai, Musashino (JP);
Yasunori Wada, Musashino (JP)

(73) Assignee: NTT, Inc., Tokyo (JP)

( * ) Notice: Subject to any disclaimer, the term of this patent is extended or adjusted under 35 U.S.C. 154(b) by 31 days.

(21) Appl. No.: 18/718,065

(22) PCT Filed: Dec. 16, 2021

(86) PCT No.: PCT/JP2021/046466

§ 371 (c)(1),
(2) Date: Jun. 10, 2024

(87) PCT Pub. No.: WO2023/112244

PCT Pub. Date: Jun. 22, 2023

(65) Prior Publication Data

US 2025/0055680 A1     Feb. 13, 2025

(51) Int. Cl.
*H04L 9/08*          (2006.01)
*G06F 21/44*         (2013.01)
(Continued)

(52) U.S. Cl.
CPC ............ *H04L 9/0869* (2013.01); *G06F 21/44* (2013.01); *G06F 21/554* (2013.01); *G06F 21/57* (2013.01); *G06F 21/64* (2013.01)

(58) Field of Classification Search
CPC ..... H04L 9/0869; G06F 21/44; G06F 21/554; G06F 21/57; G06F 21/64
See application file for complete search history.

(56) References Cited

U.S. PATENT DOCUMENTS 9,177,153 B1 * 11/2015 Perrig .................... G06F 21/57
2002/0046359 A1 * 4/2002 Boden ................. G11B 27/329
                                                711/E12.092

(Continued)

OTHER PUBLICATIONS

Park et al., "Soft Tamper-Proofing via Program Integrity Verification in Wireless Sensor Networks", IEEE Transactions on Mobile Computing, vol. 4, No. 3, May/Jun. 2005, pp. 297-309.

(Continued)

*Primary Examiner* — Shaqueal D Wade-Wright
(74) *Attorney, Agent, or Firm* — XSENSUS LLP

(57) ABSTRACT

A detection system includes a node and a verification server, wherein the node includes first processing circuitry configured to generate a plurality of random values based on a seed received from the verification server, and generate a response based on information on an area of a first storage content specified by the plurality of generated random values, and transmit the generated response to the verification server, and the verification server includes second processing circuitry configured to generate a plurality of random values based on the seed, generate a verification response based on information on an area of a second storage content specified by the plurality of generated random values, determine whether the response received from the node matches the verification response, and output a determination result.

19 Claims, 9 Drawing Sheets

(51) Int. Cl.
    *G06F 21/55*       (2013.01)
    *G06F 21/57*       (2013.01)
    *G06F 21/64*       (2013.01)

(56)                References Cited

U.S. PATENT DOCUMENTS

| | | | | |
|---|---|---|---|---|
| 2017/0086181 | A1* | 3/2017 | Briggs | H04W 72/044 |
| 2018/0039484 | A1* | 2/2018 | La Fratta | G11C 11/4087 |
| 2021/0126788 | A1* | 4/2021 | Kitazawa | H04L 9/0838 |
| 2021/0258149 | A1* | 8/2021 | Kawaguchi | H04L 9/085 |
| 2022/0385451 | A1* | 12/2022 | Vimercati | G06F 12/0638 |
| 2023/0025331 | A1* | 1/2023 | Asar | G06F 16/219 |

OTHER PUBLICATIONS

Seshadri et al., "SWATT: SoftWare-based ATTestation for Embedded Devices", Proceedings of the 2004 IEEE Symposium on Security and Privacy, Jul. 1, 2004, pp. 1-11.

Sehatbakhsh et al.; "EMMA : Hardware /Software Attestation Framework for Embedded Systems Using Electromagnetic Signals", Proceedings of the 52nd Annual IEEE/ACM International Symposium on Microarchitecture, MICRO '52, ACM Press, New York, NY, USA, Oct. 12, 2019 (Oct. 12, 2019), pp. 983-995, XP058476936; DOI: 10.1145/3352460.3358261; ISBN: 978-1-4503-6938-1.

Castelluccia et al.; "On the Difficulty of Software-Based Attestation of Embedded Devices", Computer and Communications Security, ACM, 2 Penn Plaza, Suite 701, New York, NY 10121-0701 USA, Nov. 9, 2009 (Nov. 9, 2009), pp. 400-409, XP058271048; DOI: 10.1145/1653662.1653711; ISBN: 978-1-60558-894-0.

* cited by examiner

Cell-based Traversal
(a)

DETECTION SYSTEM, DETECTION METHOD, AND DETECTION PROGRAM

CROSS-REFERENCE TO RELATED APPLICATION

This application is a national stage application, pursuant to 35 U.S.C. § 371, of International Patent Application No. PCT/JP2021/046466, filed Dec. 16, 2021, the entire contents of which are incorporated herein by reference.

TECHNICAL FIELD

The present invention relates to a detection system, a detection method, and a detection program.

BACKGROUND ART

Tampering detection technologies include a conventional technology called an attestation technology. In the attestation technology, a digest (hash value, checksum or the like) at a point of time when an entire monitoring target storage can be regarded as normal is acquired, and the acquired digest is periodically compared with a current monitoring target digest to check whether illegal tampering has occurred in the target storage.

Among the attestation technologies, the technical field of executing all the processes by software is called a software-based attestation technology. In software-based attestation technology, it is necessary to read all information in a target storage in order to generate a digest, and as a method of reading the information, the two approaches of sequential scanning and random scanning have been taken.

Sequential scanning is the simplest method of generating a digest sequentially from the head of the storage. Since the sequential scan is the simplest method, the calculation amount is also the minimum (O(m)). m is a storage size.

Random scanning is a method of reading memory cells and blocks at random based on a pseudo random number and reading a digest. Random scanning is robust in response to an escrow attack in hijacked equipment.

CITATION LIST

Non Patent Literature

[NPL 1] Taejoon Park, Kang G. Shin, "Soft Tamper-Proofing via Program Integrity Verification in Wireless Sensor Networks", IEEE TRANSACTIONS ON MOBILE COMPUTING, VOL. 4, No. 3, MAY/JUNE 2005
[NPL 2] Arvind Seshadri, Adrian Perrig, Leendert van Doorn, Pradeep Khosla, "SWATT: SoftWare-based ATTestation for Embedded Devices", Proceedings of the 2004 IEEE Symposium on Security and Privacy

SUMMARY OF INVENTION

Technical Problem

Sequential scans are vulnerable to the deposited attack of the equipment, although the computational complexity is minimal. On the other hand, the random scan is robust against the deposit attack, but a certain amount of calculation 0 (m log(m)) is required.

An object of the present invention is to provide a detection system, a detection method, and a detection program that are capable of executing a scan robust against a deposit attack with a small amount of calculation.

Solution to Problem

In order to solve the above problems and achieve the object, the detection system has a node and a verification server. The node includes first processing circuitry configured to generate a plurality of random values based on a seed received from the verification server, generate a response based on information on an area of a first storage content specified by the plurality of generated random values, and transmit the generated response to the verification server. The verification server includes second processing circuitry configured to generate a plurality of random values based on the seed generate a verification response based on information on an area of a second storage content specified by the plurality of generated random values, determine whether the response received from the node matches the verification response, and output a determination result.

Advantageous Effects of Invention

According to the present invention, a scan that is robust against escrow attacks and has a low computational complexity can be performed.

DESCRIPTION OF EMBODIMENTS

Hereinafter, examples of the detection system, detection method, and detection program disclosed in the present application will be described in detail based on the drawings. Note that this embodiment is not intended to limit the scope of the present invention.

EXAMPLES

Prior to the description of the present example, the outline of the software-based attestation technology to be a base will be described. The software-based attestation technology consists essentially of the following two steps (Step S1 and Step S2).

Step S1 will be described below. The software-based attestation technology fills the free area of the storage on the equipment with a pseudo random number in Step S1. Since it is difficult to prove that the free area is free, the free area for each storage of the equipment is filled with non-compressible random numbers. Further, the information of the entire storage having the random number compensation is held also on the verification server side. At this time, the random number itself is not stored, but the seed value generating the random number is stored, so that the capacity to be stored on the verification server side can be reduced.

Step S2 will be described below. The software-based attestation technology sends a challenge from the verification server to the equipment in Step S2, and returns a corresponding response within a time limit.

The challenge includes a random value called a Nonce. The device that has received the challenge takes out the Nonce included in the challenge and generates its own memory information and a response that proves that the device has correctly held the Nonce.

Specifically, the response may be "hash value of data obtained by combining Nonce and memory information". In addition, "message authentication code of Nonce using a hash value obtained by combining Nonce and memory information as a key" may be considered as the contents of the response.

In order to generate the response described in Step S2, it is necessary to read all the information of the storage of the equipment itself, and sequential scanning and random scanning exist in this reading method.

Figure 1:
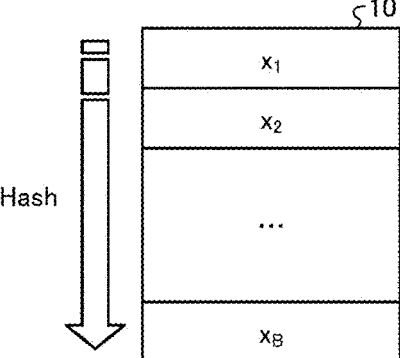
FIG. 1 is a diagram for illustrating sequential scanning.

First, sequential scanning will be described. FIG. 1 is a diagram for illustrating sequential scanning. In the sequential scanning, a checksum and a hash digest are sequentially generated from a head cell of a program memory 10. For example, a checksum and a hash digest are generated in the order of $x_1, x_2, \ldots,$ and $x_3$. A digest generation method is the simplest digest generation method, and the calculation amount is O(m). m is the memory size of the program memory 10.

Figure 2:
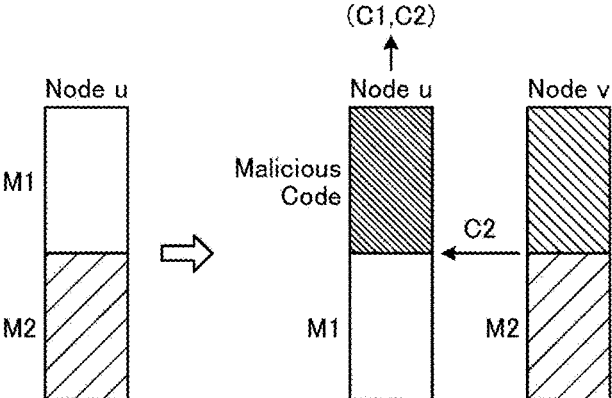
FIG. 2 is a diagram for illustrating a deposit attack on sequential scanning.

FIG. 2 is a diagram for illustrating a deposit attack on sequential scanning. For example, memory contents of a certain Node u are divided into M1 and M2, M1 is stored in the Node u, and M2 is stored in a Node v. Thus, since a free area is formed in the Node u, a malicious code can be embedded in the free area.

At the time of an attestation to the Node u, first, a hash of object C1 is generated using M1 in the Node u, the hash of object C1 is passed to the Node v, a subsequent hash C2 is generated using M2, and a response (C1, C2) is generated. Thus, by performing communication between memory cells, it is possible to avoid detection of alteration of the Node u.

Figure 3:
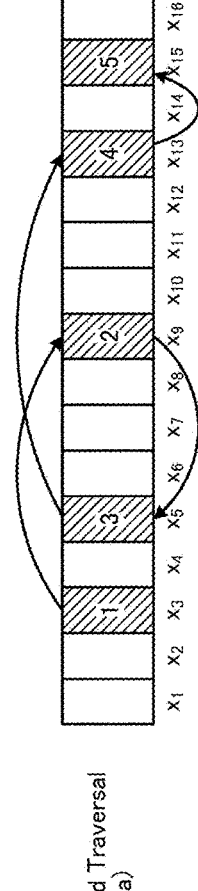
FIG. 3 is diagram for illustrating random scanning.

Subsequently, random scanning will be described. The random scanning is a method that has resistance to the deposit attack illustrated in FIG. 2. FIG. 3 is diagram for illustrating random scanning.

In the random scanning, a Nonce value included in the challenge is treated as a seed value of a uniform pseudo random number, and a cell or a block to be read is determined based on the value of the generated uniform pseudo random number. The read cells and blocks are sequentially input to the digest generation algorithm. For example, there may be a design such that the value of the finally generated digest (=response) changes depending on the order of the cells and blocks to be read. In the example illustrated in FIG. 3, blocks $x_3, x_9, x_5, x_{13},$ and $x_{15}$ are read out in order and sequentially input to the digest generation algorithm.

With the above-described design, if a deposit attack is attempted, a very large number of communications are required between memory cells, and an overhead increases, so that it is difficult to generate a correct response within a limited time. At this time, the random scanning must satisfy the following three requirements (1) to (3).

The requirement (1) is a requirement that an attacker cannot predict a cell or a block to be read in advance, calculate a response in advance, nor deceive a verification server by a reply attack. This requirement (1) can be achieved if the Nonce value sent from the verification server cannot be predicted and the response correctly depends on the Nonce value.

The requirement (2) is a requirement that even one-byte falsification can be detected with high probability. In the conventional random scan, this requirement (2) has been achieved by determining the number of times of generation of uniform pseudo-random numbers based on the coupon collector problem. Specifically, when the number of memory cells and the number of blocks are defined as m, a random number is generated cm log(m) times, and when it is used for digest generation, it is possible that an upper bound on the probability that all memory cells or blocks will not be read with $m^{\wedge}(1-c)$. m is a memory size, and c is a constant.

The requirement (3) is a requirement that parallel processing is impossible. This is because, if parallel processing is possible, there is a possibility that an attacker can perform parallel processing on a large number of devices, thereby offsetting the increased communication overhead associated with random scanning.

In the detection system according to the present embodiment, improvement of the random scanning is considered. As described in the above-described random scan requirement (2), random scans using uniform pseudo-random numbers have a high likelihood of reading a plurality of identical cells or blocks, resulting in a high calculation cost. Then, it is determined whether the storage content information is altered by an algorithm (random scan without duplication) satisfying the requirements (1) to (3) by applying a shuffle algorithm.

Figure 4:
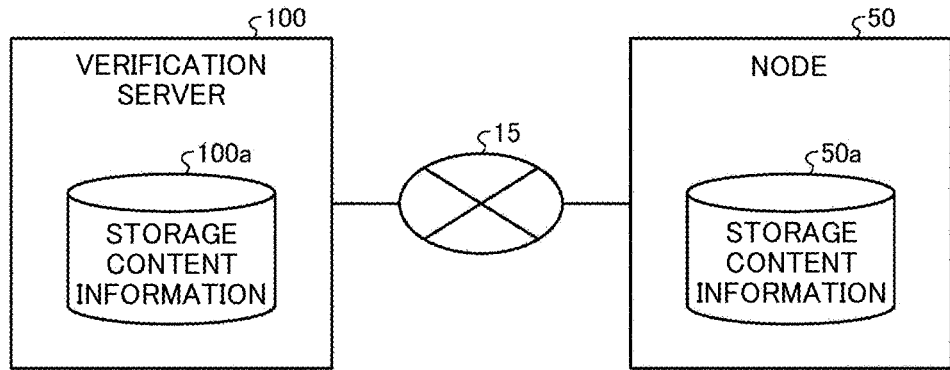
FIG. 4 is a diagram illustrating an example of a detection system according to the present example.

FIG. 4 is a diagram illustrating an example of the detection system according to the present example. FIG. 4 includes a verification server 100 and a node 50. The verification server 100 and the node 50 are connected to each other via a network 15. Although only the node 50 is illustrated in FIG. 4, the detection system according to Present Example 1 may include other nodes.

The verification server 100 safely saves storage content information 100a of the node 50 to be verified for integrity. The node 50 saves storage content information 50a. For example, the verification server 100 acquires the storage content information 50a of the node 50 at a point of time when the storage content information 50a can be regarded as safe, and registers it in the storage content information 100a. When the storage content information 50a is not altered by the attacker, the content of the storage content information 100a and the content of the storage content information 50a should be matched.

The verification server 100 generates a random Nonce value acting as a seed value in the case of executing random scanning, sets the generated Nonce value in challenge information, and transmits it to the node 50. The node 50 receives the challenge information, executes random access to the storage content information 50a based on a Nonce value set in the challenge information, Response information is generated.

Figure 5:
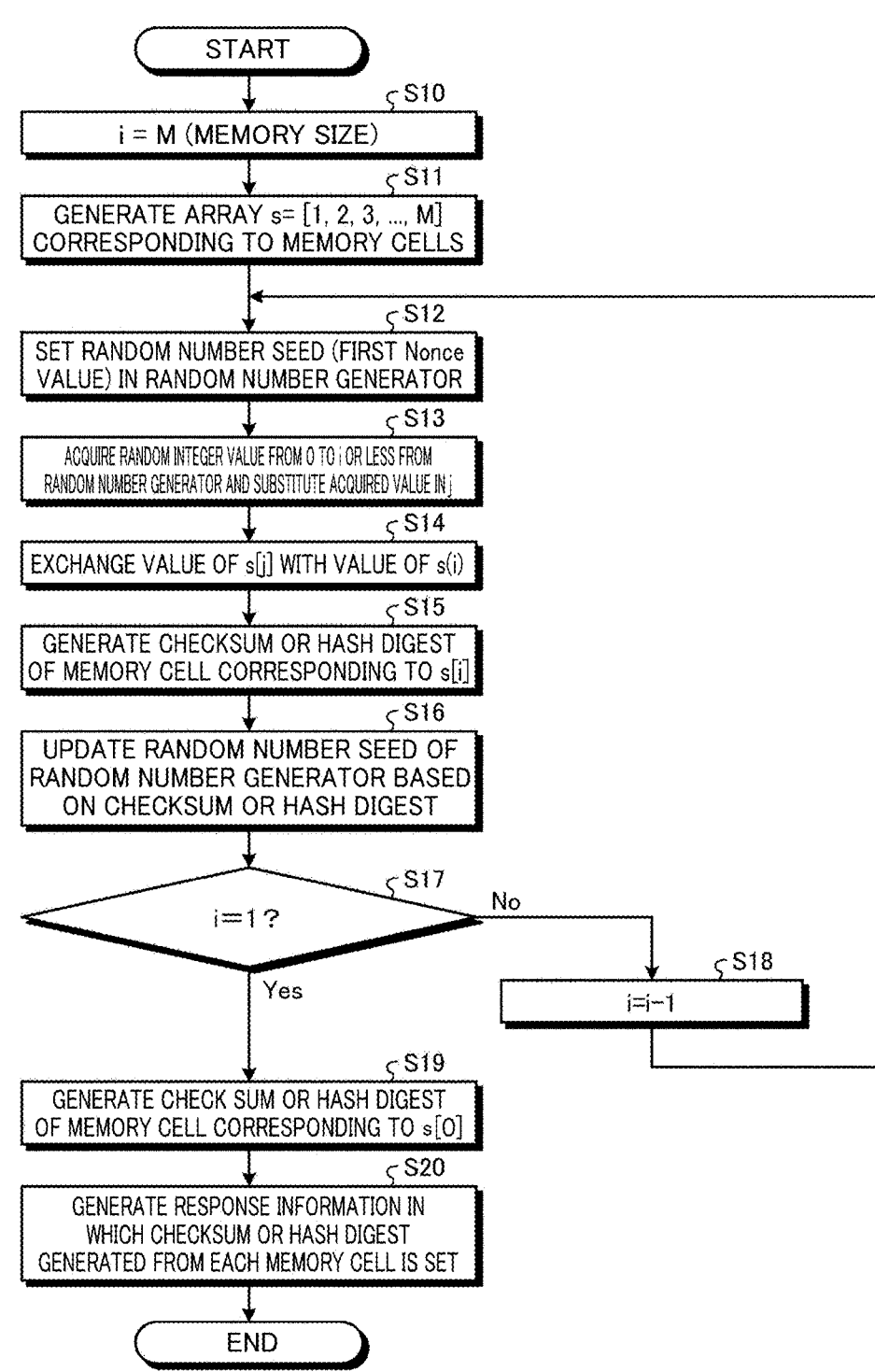
FIG. 5 is a flowchart illustrating a random access processing procedure according to the present example.

Hereinafter, processing procedures to be executed by the node 50 will be described. FIG. 5 is a flowchart illustrating a random access processing procedure according to the present example. For example, the memory size of the storage content information 50a is defined as M. Also, s[n] is defined as the n-th memory cell of the storage content information 50a.

As illustrated in FIG. 5, the node 50 sets i=M (Step S10). The node 50 creates an array s=[1, 2, 3, . . . , M] corresponding to the memory cell (Step S11). A random number seed is set in a random number generator (Step S12). The first random number seed set in the random number generator is set to a Nonce value set in the challenge information. The node 50 acquires a random integer value from 0 to i or less from the random number generator and substitutes it in j (Step S13).

The node 50 exchanges the value of s[j] with the value of s[i] (Step S14). The node 50 generates a checksum or a hash digest of the memory cell corresponding to s[i] (Step S15).

The node 50 updates the random number seed of the random number generator based on the checksum or the hash digest (Step S16). In a case where the condition of i=1 is not satisfied (Step S17, No), the node 50 updates the value of i by "i=i−1" (Step S18), the processing moves to Step S12.

On the other hand, in a case where the condition of i=1 is satisfied (Step S17, Yes), the node 50 generates a checksum or a hash digest of the memory cell corresponding to s[0] (Step S19). The node 50 generates response information in which the checksum or the hash digest generated from each memory cell is set (Step S20).

The node 50 generates the response information by executing the processing illustrated in FIG. 5, and transmits the generated response information to the verification server 100.

Here, the verification server 100 executes random access to the storage content information 100a based on the Nonce value of the challenge information transmitted to the node 50 which is a Nonce value generated by itself, and generates the verification response information based on the execution result. The contents of the random access processing executed by the verification server 100 are the same as those of the random access processing executed by the node 50 illustrated in FIG. 5.

The verification server 100 determines that the storage content information 50a of the node 50 is not altered in a case where the response information received from the node 50 matches the verification response information. On the other hand, in a case where the response information and the verification response information do not match, the verification server 100 regards that the storage content information 50a is altered and outputs an alert.

As described above, in the detection system according to the present embodiment, the node 50 generates a plurality of random values based on the Nonce value received from the verification server 100, and generates the response information based on the memory cell in the position based on each random value. On the other hand, the verification server 100 generates a random value based on the Nonce value notified to the node 50, and generates verification response information based on the memory cell at a position based on each random value. The verification server 100 determines whether the storage content information 50a of the node 50 is altered based on the response information and the verification response information.

The node 50 and the verification server 100 apply the shuffle algorithm as illustrated in FIG. 5, and execute random scan without duplication in which the result changes by a unique seed value (Nonce value) generated by the verification server 100, so that the calculation amount can be reduced to O(M) while satisfying requirements (1) to (3) of random scanning.

Figure 6:
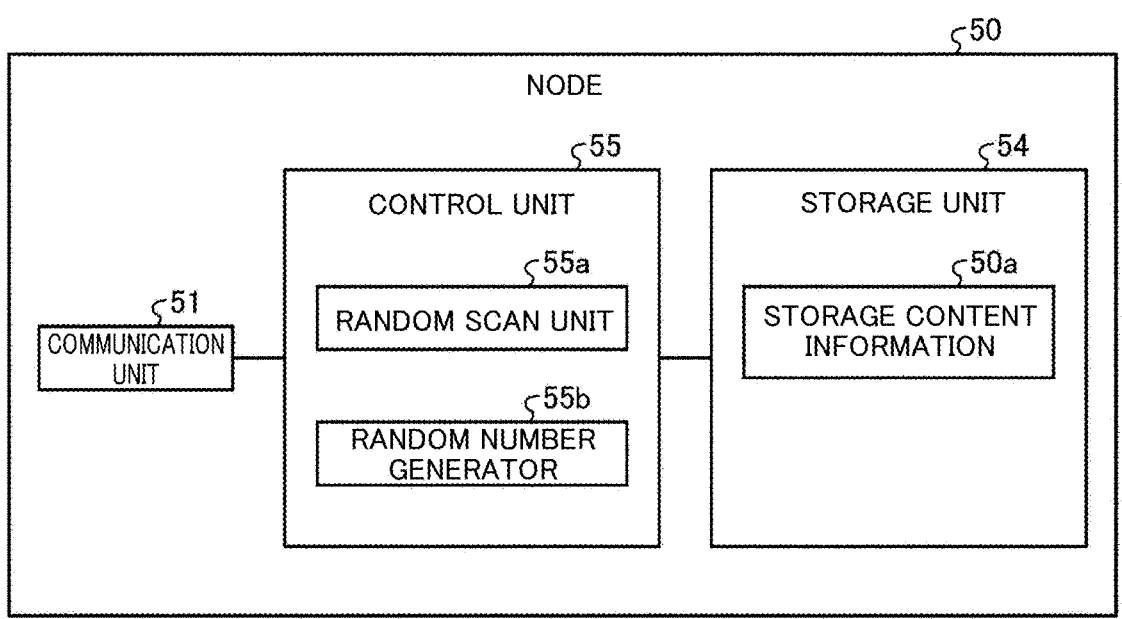
FIG. 6 is a functional block diagram illustrating a configuration of a node according to the present example.

Next, the configuration example of the node 50 illustrated in FIG. 4 will be described. FIG. 6 is a functional block diagram illustrating the configuration of the node according to the present example. As illustrated in FIG. 6, the node 50 includes a communication unit 51, a storage unit 54, and a control unit 55.

The communication unit 51 is a communication interface that transmits and receives various types of information to and from the verification server 100 connected via the network 15 or the like. The communication unit 51 is realized by a Network Interface Card (NIC) or the like, and communicates between the verification server 100 and the control unit 55 via a telecommunication line such as a Local Area Network (LAN) or the Internet.

The storage unit 54 has the storage content information 50a. The storage unit 54 is realized by a semiconductor memory element such as a random access memory (RAM) or a flash memory (Flash Memory), or a storage device such as a hard disk or an optical disc.

The storage content information 50a is preset information, for example, information to be referred to when the node 50 executes predetermined processing.

The control unit 55 has a random scan unit 55a and a random number generator 55b. The control unit 55 is realized using a central processing unit (CPU) or the like.

The random scan unit 55a acquires the challenge information from the verification server 100, and executes random access to the storage content information 50a based on the Nonce value set in the challenge information. The random scan unit 55a generates response information based on the execution result of random access, and transmits the generated response information to the verification server 100.

The processing procedure of the random scan executed by the random scan unit 55a is the same as the processing procedure illustrated in FIG. 5. The random scan unit 55a acquires a random value by setting a random number seed in the random number generator 55b. In a case of acquiring a random value using the random number generator 55b, the random scan unit 55a controls the random number generator 55b so that each time the random number generator 55b generates a random value, the range that the next random value can take is gradually narrowed. Thus, random scanning without duplication can be performed.

The random scan unit 55a sets each checksum or hash digest generated in the random scan process as a time-series list in response information.

The random number generator 55b outputs a random value based on the set random number seed. In a case where the random number generator 55b outputs the random value, the random number generator 55b outputs the random value within a range designated by the random scan unit 55a.

Figure 7:
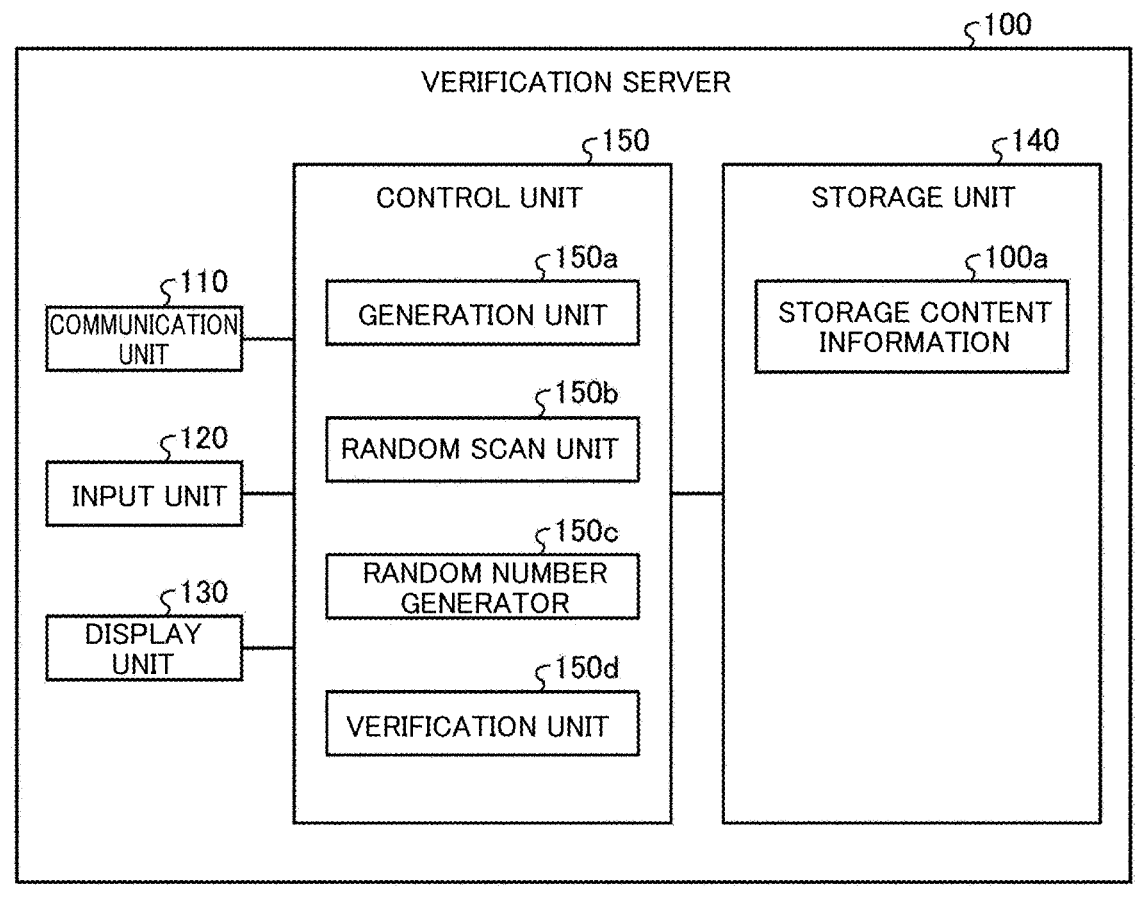
FIG. 7 is a functional block diagram illustrating a configuration of a verification server according to the present example.

Next, the configuration example of the verification server 100 illustrated FIG. 4 will be described. FIG. 7 is a function block diagram illustrating a configuration of the verification server according to the present example. As illustrated in FIG. 7, the verification server 100 includes a communication unit 110, an input unit 120, a display unit 130, a storage unit 140, and a control unit 150.

The communication unit 110 is a communication interface that transmits and receives various types of information to and from the node 50 connected via the network 15 or the like. The communication unit 110 is realized by the NIC or the like, and performs communication between the node 50 and the control unit 150 via electric communication lines such as the LAN and the Internet.

The input unit 120 is an input interface for receiving various operations from an operator of the verification server 100. For example, the input unit 120 is configured of an input device such as a keyboard or a mouse.

The display unit 130 is an output device that outputs information acquired from the control unit 150, and is realized by a display device such as a liquid crystal display, a printing device such as a printer, and the like.

The storage unit 140 has storage content information 100a. The storage unit 140 is realized using a semiconductor memory element such as a RAM or a flash memory, or a storage device such as a hard disk or an optical disc.

At a point of time when the storage content information 50a of the node 50 can be regarded as being safe, the acquired information is stored in the storage unit 140 as the storage content information 100a. The storage content information 100a of the verification server 100 may be transmitted to the node 50 and saved as the storage content information 50a.

The control unit 150 includes a generation unit 150a, a random scan unit 150b, a random number generator 150c, and a verification unit 150d. The control unit 150 is implemented using a CPU or the like.

The generation unit 150a generates a random Nonce value acting as a seed when executing random scanning, and sets the generated Nonce value to the challenge information. The generation unit 150a transmits the challenge information to the node 50. In addition, the generation unit 150a outputs the Nonce value to the random scan unit 150b.

The random scan unit 150b acquires the Nonce value from the generation unit 150a. The Nonce value is the same as the Nonce value of the challenge information transmitted to the node 50. The random scan unit 150b executes random access to the storage content information 100a based on the Nonce value. The random scan unit 150b generates verification response information based on the execution result of random access. The random scan unit 150b outputs the verification response information to the verification unit 150d.

The processing procedure of the random scan executed by the random scan unit 150b is the same as that illustrated in FIG. 5. However, the object of random access becomes storage content information 100a. The random scan unit 150b acquires a random value by setting a random number seed in the random number generator 150c. In a case of acquiring a random value using the random number generator 150c, the random scan unit 150b controls the random number generator 150c so that each time the random number generator 150c generates a random value, the range that the next random value can take is gradually narrowed. This allows random scanning without duplication.

The random scan unit 150b sets each checksum or hash digest generated in the process of random scan as a time-series list in the verification response information.

The random number generator 150c outputs a random value based on the set random number seed. In a case where the random number generator 150c outputs a random value, the random number generator 150c outputs the random value within a range designated by the random scan unit 150b.

The verification unit 150d determines whether the storage content information 50a of the node 50 is altered based on response information received from the node 50 and the verification response information acquired from the random scan unit 150b.

The verification unit 150d determines that the storage content information 50a of the node 50 is not altered when the response information and the verification response information match each other.

In a case where the response information and the verification response information do not match, the verification unit 150d determines that the storage content information 50a of the node 50 is altered. In a case where it is determined that the information is altered, the verification unit 150d outputs a warning to the display unit 130.

Figure 8:
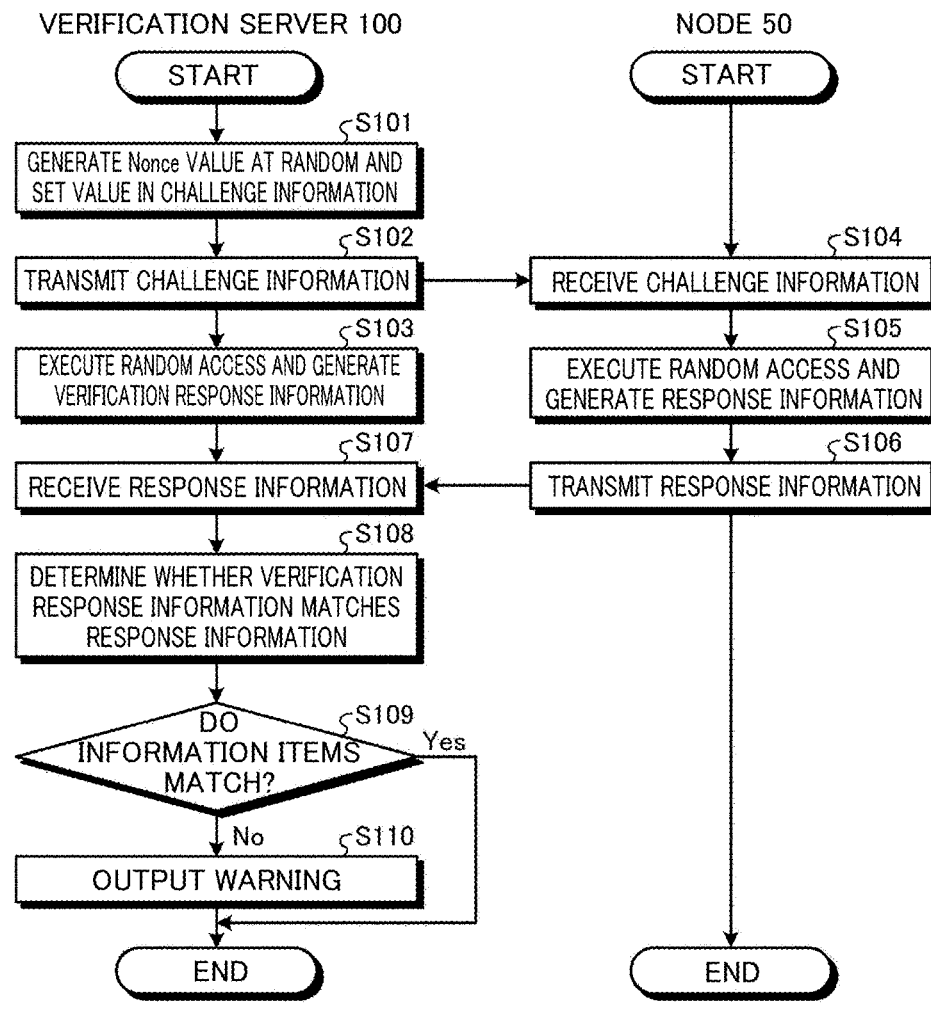
FIG. 8 is a flowchart illustrating a processing procedure of the detection system according to the present example.

Next, an example of processing procedure of the detection system according to the present example will be described. FIG. 8 is a flowchart illustrating the processing procedure of the detection system according to the present example will be described.

As illustrated in FIG. 8, the verification server 100 randomly generates the Nonce value and sets the value in challenge information (Step S101). The verification server 100 transmits the challenge information to the node 50 (Step S102). The verification server 100 executes random access based on the Nonce value and the storage content information 100a, and generates the verification response information (Step S103).

On the other hand, the node 50 receives the challenge information (Step S104). The node 50 executes random access based on the Nonce value and the storage content information 50a, and generates response information (Step S105). The node 50 transmits the response information to the verification server 100 (Step S106).

The verification server 100 receives the response information (Step S107). The verification server 100 determines whether the verification response information matches the response information (Step S108). In a case where the verification response information matches the response information (Step 3109, Yes), the verification server 100 terminates the processing. On the other hand, in a case where the verification response information and the response information do not match (Step S109, No), the verification server 100 outputs an alert (Step S110).

Next, an effect of the detection system according to the present example will be described. As described above, in the detection system, the node 50 generates a plurality of random values based on the Nonce value received from the verification server 100, and generates the response information. On the other hand, the verification server 100 generates a random value based on the Nonce value notified to the node 50, and generates the verification response information based on the memory cell at a position based on each random value. The verification server 100 determines whether the storage content information 50a of the node 50 is altered based on the response information and the verification response information.

The node 50 and the verification server 100 apply the shuffle algorithm as illustrated in FIG. 5, and execute random scan without duplication in which the result changes by a unique seed value (Nonce value) generated by the verification server 100, so that the calculation amount can be reduced to $O(m)$ while satisfying requirements (1) to (3) of random scan.

In addition, in the detection system, in a case where random access is executed, a seed value is set in a random number generator to calculate a random value, and based on information of a memory cell specified by the calculated random value, and the random number seed is updated to calculate the next random value. In addition, in the detection system, an array corresponding to the storage content specified by the random value is generated, a value of the array specified by the random value is exchanged with a value of the array specified by a variable value based on the memory size, and a checksum or a hash digest is generated based on information of the memory cell corresponding to the value of the array after exchange. Thus, random scanning robust against a deposit attack and suppressing a calculation amount can be executed.

Figure 9:
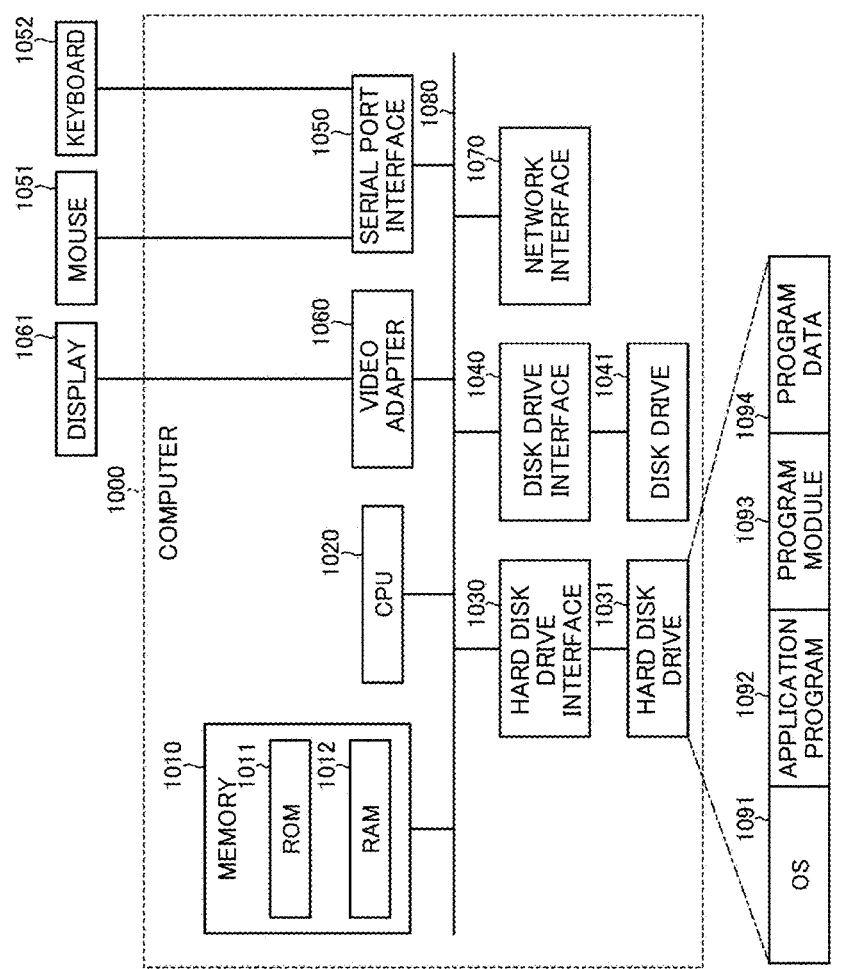
FIG. 9 is a diagram illustrating an example of a computer that executes a detection program.

Next, an example of a computer that executes the detection program will be described. FIG. 9 is a diagram illustrating an example of a computer that executes a detection program. A computer 1000 includes a memory 1010, a CPU 1020, a hard disk drive interface 1030, a disk drive interface 1040, a serial port interface 1050, a video adapter 1060, and a network interface 1070, for example. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to the disk drive 1041. An removable storage medium such as a magnetic disk or an optical disc is inserted into the disk drive 1041, for example. A mouse 1051 and a keyboard 1052 are connected to the serial port interface 1050, for example. A display 1061 is connected to the video adapter 1060, for example.

Here, an OS 1091, an application program 1092, a program module 1093, and program data 1094 are stored in the hard disk drive 1031, for example. Each piece of information described in the above embodiment is stored in the hard disk drive 1031 or the memory 1010, for example.

In addition, the detection program is stored in the hard disk drive 1031 as the program module 1093 in which commands executed by the computer 1000 are described, for example. Specifically, the hard disk drive 1031 stores the program module 1093 that describes each processing executed by the verification server 100 described in the above embodiment.

In addition, the data used for information processing by the detection program is stored in the hard disk drive 1031, for example, as the program data 1094. Thereafter, the CPU 1020 reads the program module 1093 and the program data 1094 stored in the hard disk drive 1031 into the RAM 1012 when necessary, and executes each of the procedures described above.

The program module 1093 and the program data 1094 related to the detection program are not limited to being stored in the hard disk drive 1031, and for example, may be stored in a removable storage medium and be read by the CPU 1020 via the disk drive 1041 and the like. Alternatively, the program module 1093 and the program data 1094 according to the generation program may be stored in another computer connected via a network such as a LAN, a Wide Area Network (WAN), or the like, and read by the CPU 1020 via the network interface 1070.

Although the embodiments to which the invention made by the present inventor is applied have been described above, the present invention is not limited by the descriptions and drawings forming a part of the disclosure of the present invention according to the embodiments. That is to say, other embodiments, examples, operation technologies, and the like made by those skilled in the art based on the embodiment are all included in the scope of the present invention.

REFERENCE SIGNS LIST

50 Node
50a, 100a Storage content information
51, 110 Communication unit
54, 140 Storage unit

10

55, 150 Control unit
55a, 150b Random scan unit
55b, 150c Random number generator
100 Verification server
120 Input unit
130 Display unit
150a Generation unit
150d Verification unit

The invention claimed is:

1. A detection system comprising:
a node; and
a verification server, wherein
the node includes first processing circuitry configured to:
generate a plurality of random values based on a seed received from the verification server, and
generate a response based on information on an area of a first storage content specified by the plurality of generated random values, and transmit the generated response to the verification server, and
the verification server includes second processing circuitry configured to:
generate a plurality of random values based on the seed,
generate a verification response based on information on an area of a second storage content specified by the plurality of generated random values,
determine whether the response received from the node matches the verification response, and
output a determination result,
wherein the first processing circuitry is further configured to execute processing of gradually narrowing a range that a next random value can take, each time a random value is generated, to preemptively exclude invalid values.

2. The detection system according to claim 1, wherein the first processing circuitry is further configured to set a seed received from the verification server to a random number generator to calculate a random value, update the seed based on information on an area of the first storage content specified by the calculated random value, and calculate a next random value.

3. The detection system according to claim 1, wherein the first processing circuitry is further configured to generate an array corresponding to the first storage content, exchange information on a first area of the array specified by a random value with information on a second area of the array specified by a variable value based on a memory size of the first storage content, and generate the response based on the second area after exchange.

4. The detection system according to claim 1, wherein the second processing circuitry is further configured to output a warning in a case where the response received from the node does not match the verification response.

5. The detection system according to claim 1, wherein:
the first processing circuitry is further configured to generate an array s corresponding to memory cells of the first storage content, and wherein the random values are used to exchange a value of the array s at a randomly selected index j with a value of the array s at a current index i.

6. The detection system according to claim 5, wherein:
the first processing circuitry is further configured to decrement the current index i after each exchange, thereby gradually narrowing the range for the next random value.

7. The detection system according to claim 5, wherein:
the first processing circuitry is further configured to generate a checksum or hash digest of a memory cell corresponding to the value of the array s at the current index i after the exchange.

8. The detection system according to claim 1, wherein:
the first processing circuitry includes a random number generator, and the first processing circuitry is configured to acquire a random integer value from 0 to a current variable i or less from the random number generator.

9. The detection system according to claim 1, wherein:
the first processing circuitry is configured to generate the response information based on information on the area of the first storage content as a time-series list of checksums or hash digests generated during a random scan of the first storage content.

10. The detection system according to claim 1, wherein:
the node comprises communication circuitry configured to receive challenge information containing the seed from the verification server and transmit the response to the verification server.

11. The detection system according to claim 1, wherein:
the node comprises a storage including a flash memory or a Random Access Memory (RAM) storing the first storage content.

12. The detection system according to claim 1, wherein:
the second processing circuitry of the verification server is configured to set a first random number seed in a random number generator based on a nonce value included in challenge information sent to the node.

13. A detection method of a detection system including a node and a verification server, the method comprising:
in the node,
generating a plurality of random values based on a seed received from the verification server, generating a response based on information on an area of a first storage content specified by the plurality of generated random values, and transmitting the generated response to the verification server; and
gradually narrowing a range that a next random value can take, each time a random value is generated, to pre-emptively exclude invalid values, and
in the verification server,
generating a plurality of random values based on the seed and generating a verification response based on information on an area of a second storage content specified by the plurality of generated random values, and
determining whether the response received from the node matches the verification response, and outputting a determination result.

14. The detection method according to claim 13, further comprising:
generating an array corresponding to memory cells of the first storage content;
acquiring a random integer value j; and
exchanging a value of the array at the random integer value j with a value of the array at a current index i.

15. The detection method according to claim 14, further comprising:
generating a checksum or hash digest of a memory cell corresponding to the value of the array at the current index i; and
updating the seed based on the checksum or hash digest.

16. The detection method according to claim 13, wherein:
the gradually narrowing the range comprises decrementing a variable representing a current size of a selectable range of the first storage content after each generation of a random value.

17. A non-transitory computer-readable recording medium storing therein a detection program that causes a computer to execute a process comprising:
transmitting a seed to a node, causing the node to execute a first random scan for a first storage content based on the seed and acquiring a response resulting from the first random scan from the node;
generating a plurality of random values based on the seed and generating a verification response based on information on an area of the second storage content specified by the plurality of generated random values; and
determining whether the response received from the node and the verification response match, and outputting a determination result,
wherein the generating includes gradually narrowing a range that a next random value can take, each time a random value is generated, to preemptively exclude invalid values.

18. The non-transitory computer-readable recording medium according to claim 17, wherein the process further comprises:
generating an array corresponding to the first storage content; and
exchanging a value in the array specified by one of the plurality of random values with a value in the array specified by a loop variable that decreases with each iteration of the first random scan.

19. The non-transitory computer-readable recording medium according to claim 17, wherein the process further comprises:
generating response information in which a checksum or hash digest generated from each memory cell of the first storage content is set as a time-series list.

* * * * *